J. B. DUNLAP.
SPRING WHEEL.
APPLICATION FILED OCT. 24, 1910.
998,679.
Patented July 25, 1911.
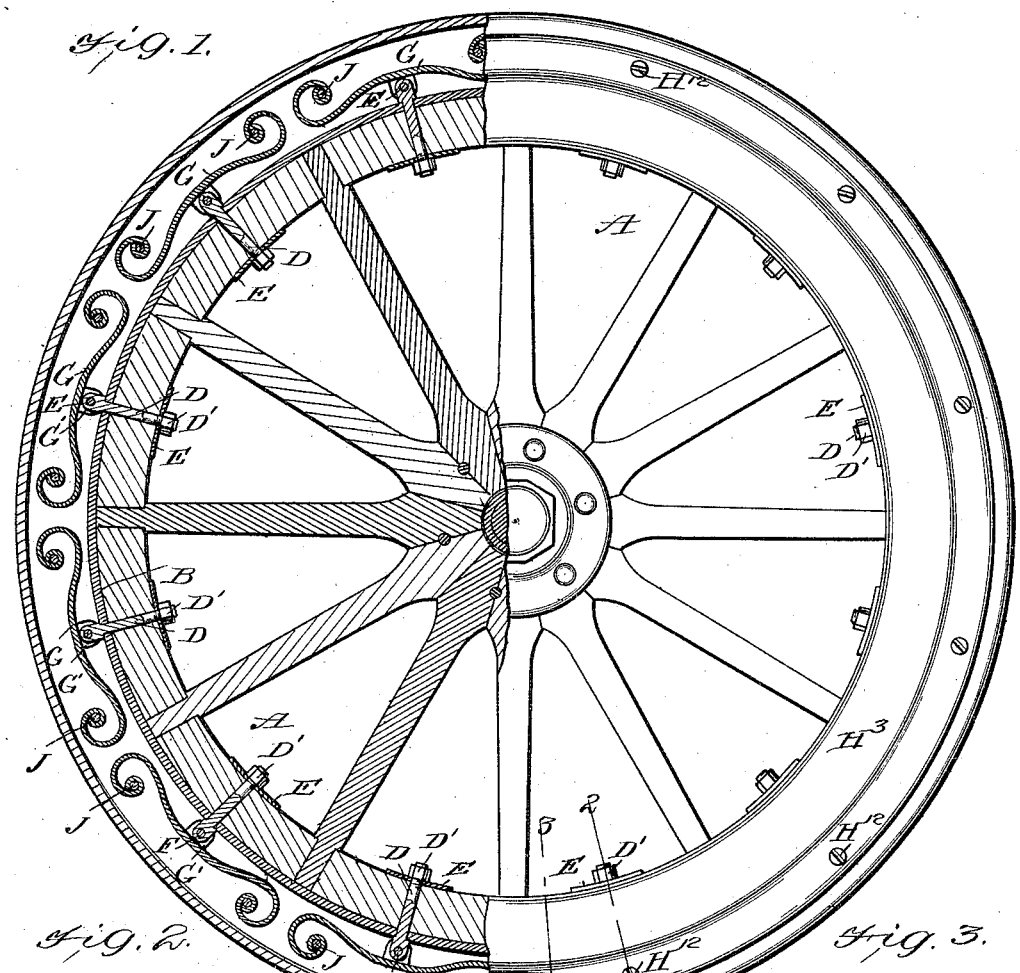
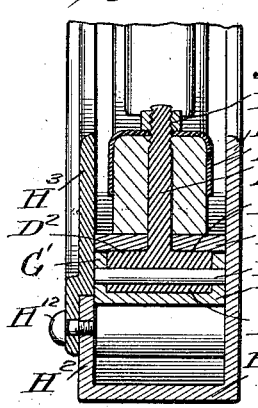
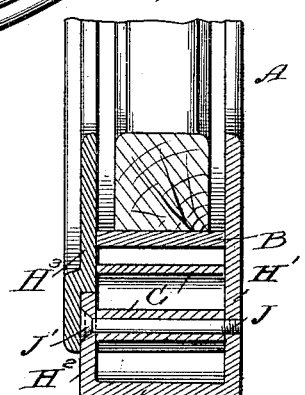
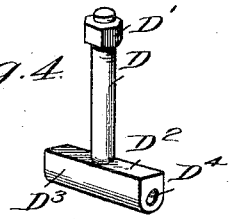
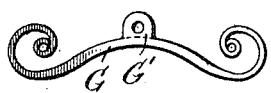
WITNESSES:
F. C. Barry
Perry B. Serpier
INVENTOR
Joseph B. Dunlap
BY Munn & Co.
ATTORNEYS

UNITED STATES PATENT OFFICE.

JOSEPH B. DUNLAP, OF TULSA, OKLAHOMA, ASSIGNOR OF ONE-EIGHTH TO GEO. RICKER, OF TULSA, OKLAHOMA, AND ETTA L. RICKER.

SPRING-WHEEL.

998,679.   Specification of Letters Patent.   Patented July 25, 1911.

Application filed October 24, 1910. Serial No. 588,606.

*To all whom it may concern:*

Be it known that I, JOSEPH B. DUNLAP, a citizen of the United States, and a resident of Tulsa, in the county of Tulsa and State of Oklahoma, have invented certain new and useful Improvements in Spring-Wheels, of which the following is a specification.

This invention is an improvement in spring wheels, and has for an object to provide a novel construction of wheel, in which an ordinary wheel proper may be employed, and a rim is arranged around the wheel proper and spaced therefrom, and springs are arranged between the wheel proper and the spaced rim, and the springs are so connected with both the wheel proper and the spaced rim, as to secure an efficient resilient connection between the wheel proper and the rim, in such manner as to avoid rigid connections which would tend to crystallization; and the invention consists in certain novel constructions and combinations of parts, as will be hereinafter described and claimed.

In the drawing, Figure 1 is a side view partly in section of a wheel embodying my invention. Fig. 2 is a cross section on line 2—2 of Fig. 1. Fig. 3 is a cross section on line 3—3 of Fig. 1. Fig. 4 is a detail perspective view of one of the bolts for securing the spring to the wheel proper, and, Fig. 5 is a side view of a somewhat different form of spring from that shown in Fig. 1.

In carrying out the invention, an ordinary wheel A may be employed for the wheel proper, and this wheel is shown as having the usual hub and spokes and rim, the latter being supplied with a tire B.

At intervals, and preferably midway between the spokes of the wheel proper, the rim and tire B, are bored, forming radial openings, in which are fitted bolts D, the latter projecting inwardly from the outer side of the tire B, and being secured at their inner ends by nuts D′ seating against wear-plates E in the form of yokes clasping the inner side of the tire B of the wheel.

Outside the wheel proper the bolt D is shouldered at $D^2$, with the said shoulder seated against the tire B, and at its outer end the bolt D is provided with a transverse head $D^3$ bored longitudinally at $D^4$ to receive the pin F for the purpose presently described. This bolt head $D^3$ is of a length sufficient to extend at its ends nearly to the sides of the tire B (see Fig. 2), and the pin F projects beyond the ends of the head $D^3$, and enters the lugs G′ projecting inwardly from the spring G at the opposite edges of said spring, and midway between its ends, as best shown in Fig. 1 of the drawing. By this construction the spring is secured pivotally at a point midway its ends in connection with the wheel proper by means of the pin F operating in the head $D^3$ of the bolt and projecting laterally beyond the ends of said head to enter the lugs G′ of the spring, as shown in Figs. 1 and 2. By this construction, the spring is secured to the wheel body, and has a great freedom of movement in connection with the wheel body, without being permitted to depart from its connection with said body. This pivotal connection of the spring is important, as it avoids any crystallization of the spring, such as would likely occur from a rigid connection of the spring at its middle point with the wheel body. At the same time, I secure the pivotal connection of the spring in a simple, efficient manner, and which will permit the ready demounting of the parts, as more fully described hereinafter.

It will be noticed that the pin F is not held in engagement with either the head $D^3$ or the lugs G′, so that except for the means presently described, the said pin may be moved freely in a lateral direction through the lugs G′ and through the head of the bolt. As shown, however, the pin F is held from longitudinal movement as applied, as shown in Figs. 1 and 2, by the lapping alongside thereof of the side plates H′ and $H^2$ of the spaced rim H. As shown, the rim H is provided at one side with the integral plate H′, which extends inwardly to a point about on a line with the inner surface of the rim of the wheel proper. The opposite side plate $H^2$ is secured by securing thereto an inwardly projecting flange $H^3$ at the opposite side of the spaced rim H opposite the side plate H′, and these plates H′ and $H^2$ lapping along the outer sides of the flanges G′ of the spring and the ends of the pins F, prevent any accidental detachment of said parts.

The plate $H^2$ has an offset portion $H^{12}$ overlapping the inner edge of the flange $H^2$, and this offset portion $H^{12}$ overlies the heads J′ of the screws J, which screws J operate to pivotally connect the outer ends of the springs G to the side plates of the spaced rim, thus holding the screws J from any accidental displacement.

As shown in Fig. 1, the springs G are bowed outwardly at their middles, and then are returned at their ends on their upper sides. This differs somewhat from the construction shown in Fig. 5, wherein the spring is concaved at its middle portion at $G^{10}$, and has its end portions $G^{20}$ returned inwardly.

It is manifest from the construction shown and described, that the springs are secured at their outer ends in connection with the spaced rim without the intervention of any rigid connection such as would likely produce crystallization, so that there is provided in the construction shown, a wheel which will operate resiliently, in which the load will be sustained by many of the springs supplied, in which there is resilient connection between the wheel body and the spaced rim, and wherein the danger of crystallization of the springs is reduced to the minimum.

I claim:

1. The combination, substantially as herein described, of a wheel proper provided in its rim with spaced radial openings, bolts passing through said openings and having at their outer sides transverse heads provided with longitudinal openings, pins in said heads and projecting beyond the ends thereof, springs provided at their middles with inwardly projecting lugs lapping alongside the ends of the transverse bolt heads and having openings receiving the projecting ends of the pivot pins in said openings, the opposite ends of the springs being returned and provided with eyes, a spaced rim fitting over the springs and having side plates projecting inwardly beyond and lapping alongside the pivot pins at the middles of the springs, said spaced rim having one of its side plates composed of an inwardly projecting flange and a plate offset to overlap the inner edge of said plate, means securing said overlapping portion to the plate it overlaps and screws connecting the opposite side plates of the spaced rim and extending through the eyes at the ends of the springs and underlying the overlapping offset portion of the spaced rim plate, all substantially as and for the purposes set forth.

2. The combination in a resilient rim attachment for wheels of a bolt having a head provided with a transverse opening for a pivot pin, a pivot pin in said opening and projecting at its ends beyond the head, a spring having mid-way between its ends ears lapping alongside the ends of the head and having openings receiving the projecting ends of the pivot pin, a spaced rim and means pivoting the ends of the spring to the spaced rim, all substantially as described, whereby the spring will be secured at its middle and ends in such manner as to avoid crystallization such as would result from a rigid connection, substantially as set forth.

3. The combination of a wheel body, bolts projecting radially through the same and provided outside the wheel body with heads having transverse openings, pins in said openings and projecting at their ends beyond the head, springs provided midway between their ends with inwardly projecting lugs having openings receiving the projecting ends of the pins, a spaced rim and connections between the ends of the springs and the spaced rim, substantially as set forth.

JOSEPH B. DUNLAP.

Witnesses:
SOLON C. KEMON,
PERRY B. TURPIN.

---

Copies of this patent may be obtained for five cents each, by addressing the "Commissioner of Patents, Washington, D. C."